(12) United States Patent
Klein

(10) Patent No.: US 7,881,737 B2
(45) Date of Patent: *Feb. 1, 2011

(54) METHOD AND APPARATUS FOR ACQUIRING AND ESTABLISHING A DEPLOYABLE COMMUNICATION SYSTEM

(75) Inventor: David E. Klein, Davie, FL (US)

(73) Assignee: Motorola, Inc., Schaumburg, IL (US)

( * ) Notice: Subject to any disclaimer, the term of this patent is extended or adjusted under 35 U.S.C. 154(b) by 669 days.

This patent is subject to a terminal disclaimer.

(21) Appl. No.: 11/469,179

(22) Filed: Aug. 31, 2006

(65) Prior Publication Data

US 2008/0057861 A1 Mar. 6, 2008

(51) Int. Cl.
H04B 7/00 (2006.01)
(52) U.S. Cl. .................. 455/518; 455/418; 455/419; 455/420; 455/426.1; 455/456.6; 370/406; 370/407; 370/340; 370/425
(58) Field of Classification Search ......... 455/418–420, 455/426.1, 456.6, 462, 463, 11.1, 500, 507, 455/508, 520, 521; 370/340, 406, 407, 425
See application file for complete search history.

(56) References Cited

U.S. PATENT DOCUMENTS

| | | | |
|---|---|---|---|
| 3,806,804 A | | 4/1974 | Mills et al. |
| 4,152,647 A | | 5/1979 | Gladden et al. |
| 5,125,101 A | | 6/1992 | Johnson et al. |
| 5,152,003 A | * | 9/1992 | Poch ............................ 455/18 |
| 5,629,978 A | | 5/1997 | Blumhardt et al. |
| 5,978,569 A | * | 11/1999 | Traeger ....................... 709/244 |
| 6,047,160 A | * | 4/2000 | Priest et al. ................. 455/11.1 |

(Continued)

FOREIGN PATENT DOCUMENTS

EP 0991290 A2 4/2000

(Continued)

OTHER PUBLICATIONS

PCT International Preliminary Examination Report Application No. PCT/US2007/07519 Dated Mar. 12, 2009-8 pages.

(Continued)

Primary Examiner—Edward Urban
Assistant Examiner—Fayyaz Alam
(74) Attorney, Agent, or Firm—Barbara R. Doutre

(57) ABSTRACT

A radio deployment pack (110) includes a plurality of radios and deployable infrastructure package within a single package. The package is created by placing an order including the selection of frequency band of operation and either standalone mode infrastructure, to be used when all existing infrastructure is inoperable, or expanded infrastructure mode, to be used to extend coverage across remote region having gaps in coverage. The selection of infrastructure is preferably used to assign a battery option, the battery option being either a disposable battery or rechargeable battery. The use of the RDP (110) provides a communication system without the use of local infrastructure and without prior knowledge of communication system operation. The package may further include RFIDs (404) for inventory and location tracking of the radios, portable infrastructure and or emergency equipment (410). Wired programming capability is optionally provided through the use of a smart rack 502. Wireless programming is optionally provided through the use of PAN enabled deployable elements.

15 Claims, 6 Drawing Sheets

U.S. PATENT DOCUMENTS

| | | | |
|---|---|---|---|
| 6,415,158 | B1 | 7/2002 | King et al. |
| 6,549,778 | B1 * | 4/2003 | Mulford ................ 455/426.1 |
| 6,693,236 | B1 | 2/2004 | Gould et al. |
| 7,091,852 | B2 * | 8/2006 | Mason et al. .......... 340/539.13 |
| 7,424,291 | B1 * | 9/2008 | Lunsford et al. ............ 455/420 |
| 7,437,148 | B1 * | 10/2008 | Vaghi et al. ................. 455/417 |
| 7,508,840 | B2 * | 3/2009 | Delaney ..................... 370/466 |
| 2002/0072390 | A1 * | 6/2002 | Uchiyama ................... 455/557 |
| 2003/0050083 | A1 | 3/2003 | Metais et al. |
| 2004/0023635 | A1 * | 2/2004 | Impson et al. ........... 455/404.1 |
| 2004/0121791 | A1 | 6/2004 | May et al. |
| 2004/0203799 | A1 | 10/2004 | Siegel |
| 2005/0068170 | A1 | 3/2005 | Aupperle et al. |
| 2006/0158329 | A1 * | 7/2006 | Burkley et al. ......... 340/539.13 |
| 2009/0005026 | A1 * | 1/2009 | Lunsford et al. ............ 455/418 |

FOREIGN PATENT DOCUMENTS

| | | |
|---|---|---|
| WO | 2008008658 A2 | 1/2008 |
| WO | 2008027688 A3 | 3/2008 |
| WO | 2008027689 A2 | 3/2008 |
| WO | 2008027689 A3 | 3/2008 |
| WO | 2008027690 A2 | 3/2008 |
| WO | 2008027690 A3 | 3/2008 |
| WO | 2008088580 A2 | 7/2008 |
| WO | 2008088580 A3 | 7/2008 |

OTHER PUBLICATIONS

PCT International Search Report Application No. PCT/US2007/07519 Dated Jul. 8, 2008—7 pages.
Klein—U.S. Appl. No. 11/469,240—Filing Date: Aug. 31, 2006.
USA Advisory Action Dated Apr. 23, 2009 U.S. Appl. No. 11/469,240—4 pages.
USA RCE With Accompanying Amendment Dated Apr. 26, 2008 U.S. Appl. No. 11/469,240—8 pages.
USA Final Rejection Dated Feb. 25, 2009 U.S. Appl. No. 11/469,240—12 pages.
USA Response to Final Rejection Dated Mar. 25, 2009 U.S. Appl. No. 11/469,240—3 pages.
USA Office Action Dated Oct. 10, 2008 U.S. Appl. No. 11/469,240—12 pages.
USA Response to Office Action Dated Dec. 2, 2008 U.S. Appl. No. 11/469,240—8 pages.
PCT International Written Opinion Application No. PCT/US2007/075023—Dated Sep. 16, 2008—5 pages.
Response to Written Opinion Application No. PCT/US2007/075023—Dated Dec. 2, 2008—3 pages.
PCT International Preliminary Examination Report Application No. PCT/US2007/075023—Dated Mar. 12, 2009—8 pages.
PCT International Search Report Application No. PCT/US2007/075023—Dated Sep. 16, 2008—8 pages.
Pinder—U.S. Appl. No. 11/469,280—Filing Date: Aug. 8, 2006.
PCT International Preliminary Examination Report Application No. PCT/US2007/075018—Dated Mar. 12, 2009—6 pages.
PCT International Search Report Application No. PCT/US2007/075018—Dated Feb. 25, 2008—7 pages.
Fudally—U.S. Appl. No. 11/457,565—Filing Date: Jul. 14, 2006.
USA Office Action Dated Apr. 6, 2009- U.S. Appl. No. 11/457,565—14 Pages.
USA Response to Office Action Dated Apr. 17, 2009- U.S. Appl. No. 11/457,565—10 Pages.
PCT International Preliminary Report Application No. PCT/US2007/072614 Dated Jan. 22, 2009—8 pages.
PCT International Search Report Application No. PCT/US2007/072614 Dated Mar. 3, 2008—8 pages.
Klein—U.S. Appl. No. 11/469,217—Filing Date: Aug. 31, 2006.
USA Office Action Dated Feb. 5, 2009 U.S. Appl. No. 11/469,217—19 pages.
USA Response to Office Action Dated Apr. 28, 2009 U.S. Appl. No. 11/469,217—10 pages.
USA Office Action Dated Sep. 5, 2008, U.S. Appl. No. 11/469,217—18 pages.
USA Response to Office Action Dated Nov. 10, 2008 U.S. Appl. No. 11/469,217—7 pages.
PCT International Preliminary Examination Report U.S. Appl. No. PCT/US2007/075021—Dated Mar. 12, 2009—8 pages.
PCT InternationalSearch Report Application No. PCT/US2007/075021—Dated Mar. 8, 2008—8 pages.
US Office Action Dated Jun. 26, 2009 to U.S. Appl. No. 11/469,240, 19 pages.
US Office Action Dated May 8, 2009 to U.S. Appl. No. 11/469,280, 19 pages.
USPTO Notice of Allowance Mailed Jul. 21, 2009 to U.S. Appl. No. 11/469,217, 18 pages.

* cited by examiner

METHOD AND APPARATUS FOR ACQUIRING AND ESTABLISHING A DEPLOYABLE COMMUNICATION SYSTEM

CROSS RELATED APPLICATIONS

This application is related to co-pending applications, being filed concurrently herewith and commonly owned and assigned to Motorola, Inc.

FIELD OF THE INVENTION

The present invention relates generally to communication systems and more specifically to the acquisition and establishment of a rapidly deployable communication system.

BACKGROUND

Emergency situations can arise in an instant causing destruction of localized communication resources and a lack of operable communication infrastructure. Systems that on a day to day basis co-exists and interoperate may suddenly face issues with infrastructure availability, lack of intercommunication between geographic regions, and a lack of crossover functionality between systems. Disasters, both man made and natural, may cause emergency resource personnel to be without coverage thus impeding rescue efforts. Even if partial infrastructure is available, the number of rescue personnel may not be sufficient to cover the disaster. Other potential emergency personnel, such as neighborhood volunteers, may have limited knowledge or no knowledge of communication systems.

Emergency operations planners and similar individuals need a means to rapidly move a quantity of radios to a given location and have the radios ready for use as quickly as possible using a minimum amount of equipment and process steps. In some instances it is also desirable to configure the radios prior to delivery so that the radios are operational immediately upon arrival.

The ability to acquire and establish a communication system quickly either by emergency personnel or local volunteers is highly desirable. Accordingly, there is a need for a rapidly deployable communication system.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
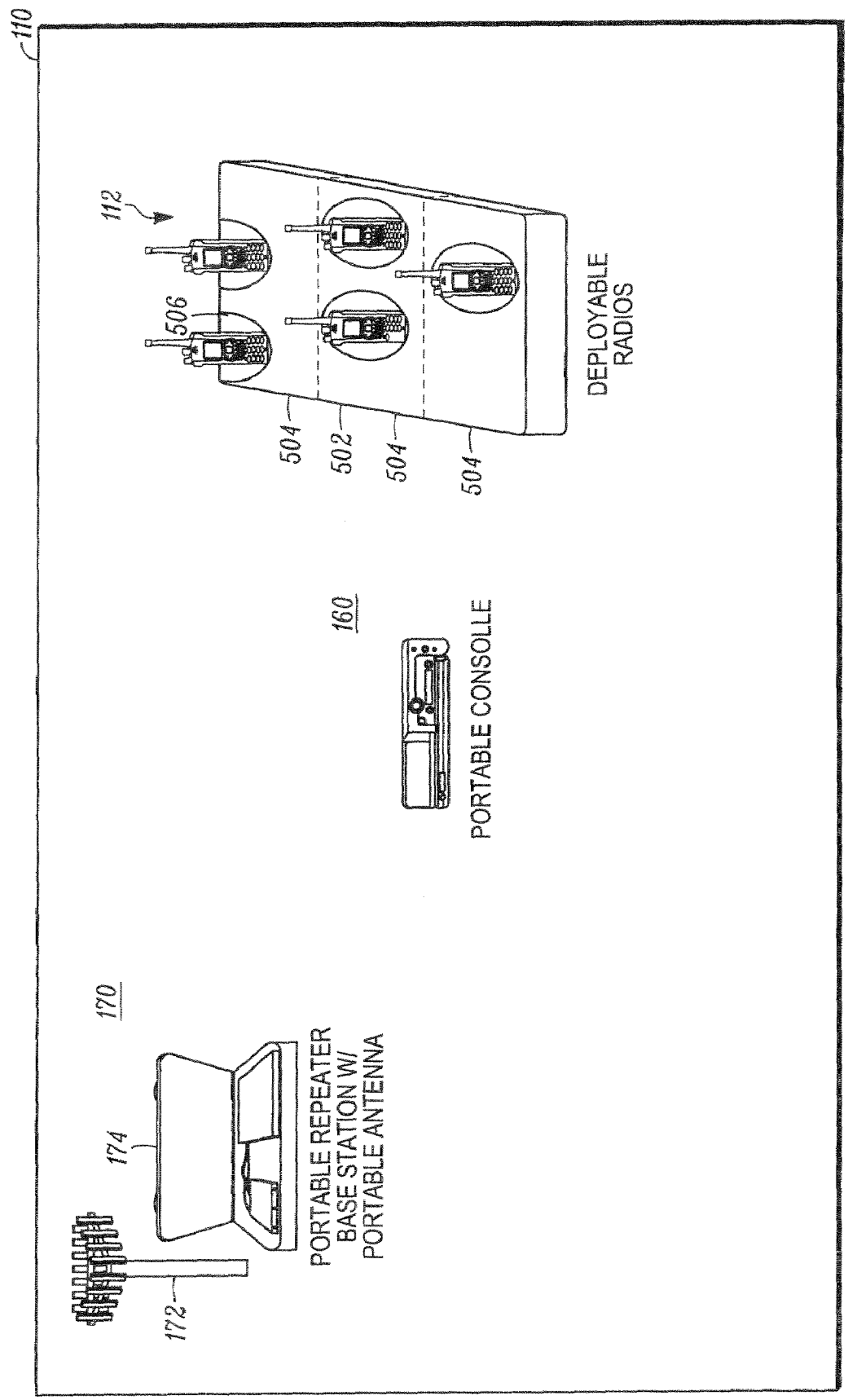
FIG. 1 is a diagram of deployable communication system elements to be used in accordance with some embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in a method and apparatus for facilitating acquisition, access and configuration of a communication system. The communication system of the present invention is quickly deployable, making the system highly advantageous for emergency situations for use by either emergency personnel or volunteers. Accordingly, components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

FIG. 1 is a diagram of deployable communication system elements to be used in accordance with some embodiments of the invention. The deployable communication system elements include a pack of portable radios 112, a deployable infrastructure, formed here of a portable console 160 and a portable repeater 170. The pack of portable radios 112 are held within a carry tray 502 to be described later. The portable console 160 preferably provides both programming capability and dispatch capability. The portable repeater 170 includes a portable antenna 172 and portable radio repeater 174. The portable antenna 172 supports communication between the portable radios 112 and the console via the portable radio repeater 174. In accordance with the present invention, the plurality of deployable elements is packaged within a unitary package referred to herein as a radio deployment package (RDP) 110.

In accordance with the present invention, the radio deployment package 110 is formed based on a customer order. The customer order preferably includes: the selection of frequency band of operation; stand-alone infrastructure option or expanded infrastructure option or both stand-alone and expanded combined. Battery options are assigned based on the type of infrastructure selected in the order. A disposable battery option and rechargeable battery option will be described later. In accordance with the present invention, the radio deployment package 110 is used for shipping and storing the pack of portable radios 112 and deployable infrastructure for on-site configuration of the communication system 100 without the use of local infrastructure and without prior knowledge of communication system operation.

The radio deployment package 110 may include radio accessories, such as belt clips, carry cases, and if applicable, programming cables and extra batteries. The deployment package 110 is stored until an unforeseen event causes local communication systems to be inoperable or until expanded operation between existing systems having communication gaps is needed. Thus, the RDP 110 can address a disaster situation, such as a hurricane situation, where there is no other exiting infrastructure or RDP 110 can provide expanded infrastructure to systems that do not typically interoperate due to coverage gaps, such a regionally distinct systems.

Figure 6:
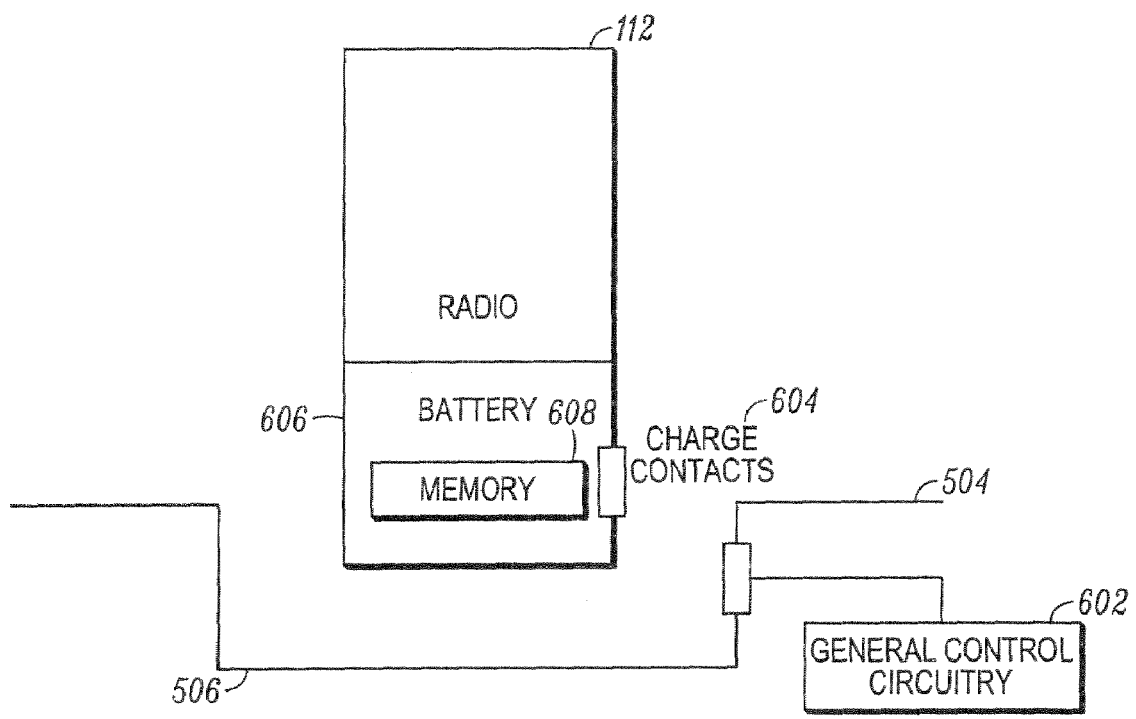
FIG. 6 is a block diagram of a portable radio and smart rack used in a deployable communication system in accordance with some embodiments of the invention.

Each portable radio 112 of RDP 110 preferably includes a preloaded battery, as seen in FIG. 6. The batteries may be primary cell batteries or secondary cell batteries or some combination thereof. For disaster type applications, primary cells are preferred so that users of the system do not have to return to a charger to recharge radios, but simply carry additional replacement cells.

Figure 2:
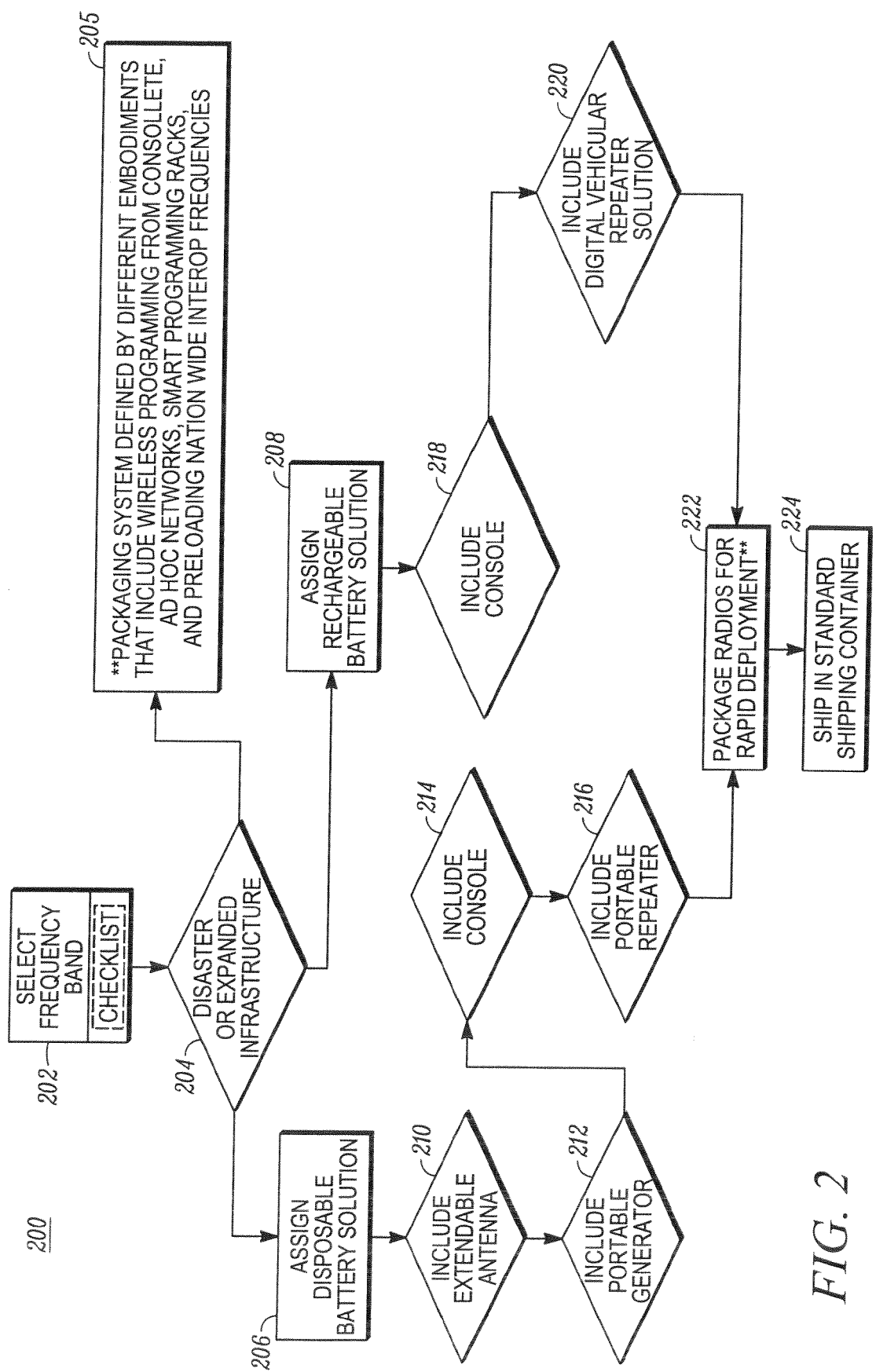
FIG. 2 is a flowchart of an order and delivery process for the acquisition of a communication system in accordance with some embodiments of the invention.

The portable radios 112 are stored in a carrying tray 502 within the package 110, the carrying tray 502 is formed of smart racks 504 with slots 506 that enable both programming of the radios and, if applicable, charging, of the batteries in a manner to be described later A method for ordering and acquiring RDP 110 in accordance with some embodiments of the invention is shown in FIG. 2. Method 200 begins by selecting the frequency band of operation at step 202 and selecting between a stand-alone infrastructure option and expanded infrastructure option at step 204. Depending on the type of infrastructure selected at 204, the packaging system is defined by different embodiments including wireless programming from the console 160, ad hoc networking, smart programming trays 502 and preloading information, for example into a memory of a primary battery. Depending of the infrastructure selected at 204, a disposable battery option is preferably assigned at step 206 (for stand-alone mode) and a rechargeable battery option is preferably assigned at step 208 (for expanded mode).

While the disposable battery option is preferably assigned at step 206 to the stand-alone infrastructure mode, and the rechargeable battery option is preferably assigned to the expanded infrastructure mode, the battery options can also be a selectable feature placed in the order. Thus, it is possible to select rechargeable batteries for use in the disaster mode infrastructure, and it is possible to select rechargeable batteries in the expanded mode infrastructure. For the sake of simplicity, disposable cells are preferred and assigned for the stand-alone system so that the user of the portable radio need not return to charge the radio, but simply carries additional replacement cells. One of the purposes of RDP 110 is to make the deployment of operational radios as quick and easy as possible for a lay person.

For the stand-alone mode infrastructure, the plurality of communication elements that will be packaged within RDP 110 are assigned at steps 210-216. In this embodiment an extendable antenna is provided at 210, a portable generator at 212, a portable console providing programming capacity at 214 and a portable radio repeater at 216. The portable generator is provided to power the console and repeater systems. The portable generator can also be used to power the smart rack, applicable.

For the expanded infrastructure mode selected at 204, the plurality of communication elements assigned to the RDP 110 include a portable console at 218 and a portable repeater at 220, which can be for example a portable radio repeater, a vehicular repeater, or a suitcase repeater. Finally, the plurality of communication elements formed of portable radios 112 and portable infrastructure (elements 206, 210, 212, 214, 216) or (elements 208, 218, 220) are packed into a unitary package at 222, the unitary package being RDP 110. The RDP 110 is then shipped at 224 to an end-customer.

For the case of disposable batteries, the RDP 110 may be unpacked immediately or stored for up to a predetermined amount of time. The amount of time the RDP 110 can be stored depends upon the shelf-life of primary cells being used and on the power configuration programming network used within the package.

The stand-alone infrastructure mode assigns elements at path 206, 210, 212, 214, and 216 intended to be used when local infrastructure at a disaster struck area is down. The stand-alone infrastructure and radios can be set up and deployed immediately by a person unfamiliar with communication infrastructure. Alternatively, the RDP 110 or can be ordered and shipped and stored for future use—ready to be deployed when disaster strikes and local systems become inoperable. Thus, for example, in a hurricane situation the RDP 110 can be opened and the system can be up and running in minutes.

The expanded infrastructure mode path 204, 208, 218, 220 is intended to inter-operate with existing infrastructure already operational in the field. The expanded infrastructure mode is intended for temporarily expanding communication capability across regions where gaps in communication currently exist. So for example, the expanded infrastructure mode may be selected in situations where a search crew is looking for a missing person in a remote region and thus a temporary interconnect to existing systems facilitates search efforts.

The radio deployment package RDP 110 can be ordered to cover both stand-alone and expanded infrastructure modes by including both paths of deployable elements within package 110. However, the combination embodiment will require additional selection steps and programming steps to be performed by the user on-site.

Keeping in mind that the recipient of RDP 110 may have limited or no knowledge of communication systems, for example neighborhood volunteers, the plurality of communication elements provide an easily deployable stand-alone system upon power up without the use of local infrastructure. This is accomplished via the use of personal area network (PAN) enabled elements and/or single-wire bus enabled elements incorporated within the package 110. Upon an emergency event, a volunteer user unpacks the RDP 110 and follows the instructions on portable console 160 to automatically deploy the communication system. Once the radios are programmed, the user is instructed by the portable console 160 to remove each radio 112 from its respective slot 506 of carry tray 502.

In yet another embodiment of the invention, the unitary package 110 can be sold to a service provider, and the service provider then pre-programs the portable radios 112 for an end-customer. The frequencies programmed are for the service provider's own system. The service provider then rents or leases the package to an end customer. Once again, the communication system of the present invention provides a simple deployment solution where the end customer does not need to know or have previous experience with setting up a radio system.

Figure 3:
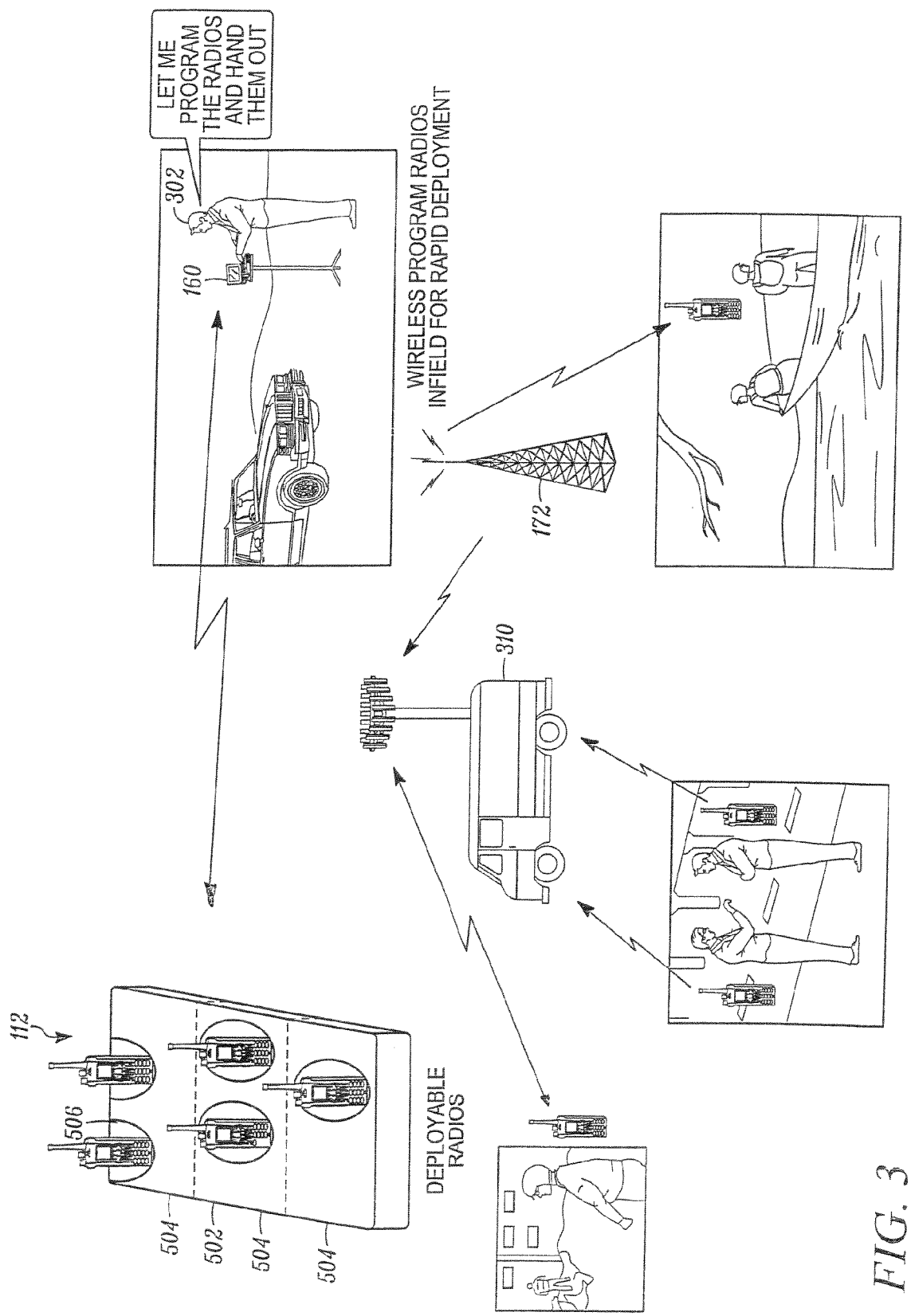
FIG. 3 is a diagram of the communication system deployment process in accordance with some embodiments of the invention.

FIG. 3 is a diagram of the communication system being deployed and operating in accordance with some embodiments of the invention. User 302 unpacks the RDP 110 and turns on the portable console 160. The portable console 160 provides a remote dispatch station as well as programming capability for the radios 112. The portable console 160 provides instructions to the user upon power-up, the instructions including instructing the portable console user to remove each radio from the package 110 to disperse to individuals, the radios automatically cloning themselves prior to removal from the carry tray 502. The programming console 160 automatically programs the radios 112 within the tray 502. Again, programming is preferably accomplished either by wireless PAN network capability and/or by single-wire bus programming. The advantage provided by these two approaches is that the programming of the radios is essentially transparent to the user doing the set up. The user sets up the portable console 160, selects a program button and disperses the programmed radios.

In the scenario of FIG. 3, the portable repeater 170 has been mounted within a vehicle 310. The programmed radios 112 communicate with each other via the portable repeater 170 having portable antenna 172. The portable console 160 includes wireless programming capability preferably PAN capability, to wirelessly program each radio of the package upon power-up of the system, prior to removal of the radios from the package. Radio deployment package 110 allows users unfamiliar with communication systems, to unpack the RDP 110, each radio powering up and becoming wirelessly cloned prior to removal of each radio from each slot 506 of the rack 502. The single-wire programming approach will be discussed in conjunction with FIGS. 5 and 6.

Alternatively, the portable console 160 can be pre-programmed with nationwide interoperability frequencies, the user opening the console can select the frequency band of operation from a user-friendly list generated upon power-up of the portable console. The user-friendly list is intended for lay-person use of the system. The portable console 160 is preferably pre-programmed to provide one of: a stand-alone infrastructure mode, or expanded infrastructure mode to be interoperated with other systems having communication gaps therebetween.

Figure 4:
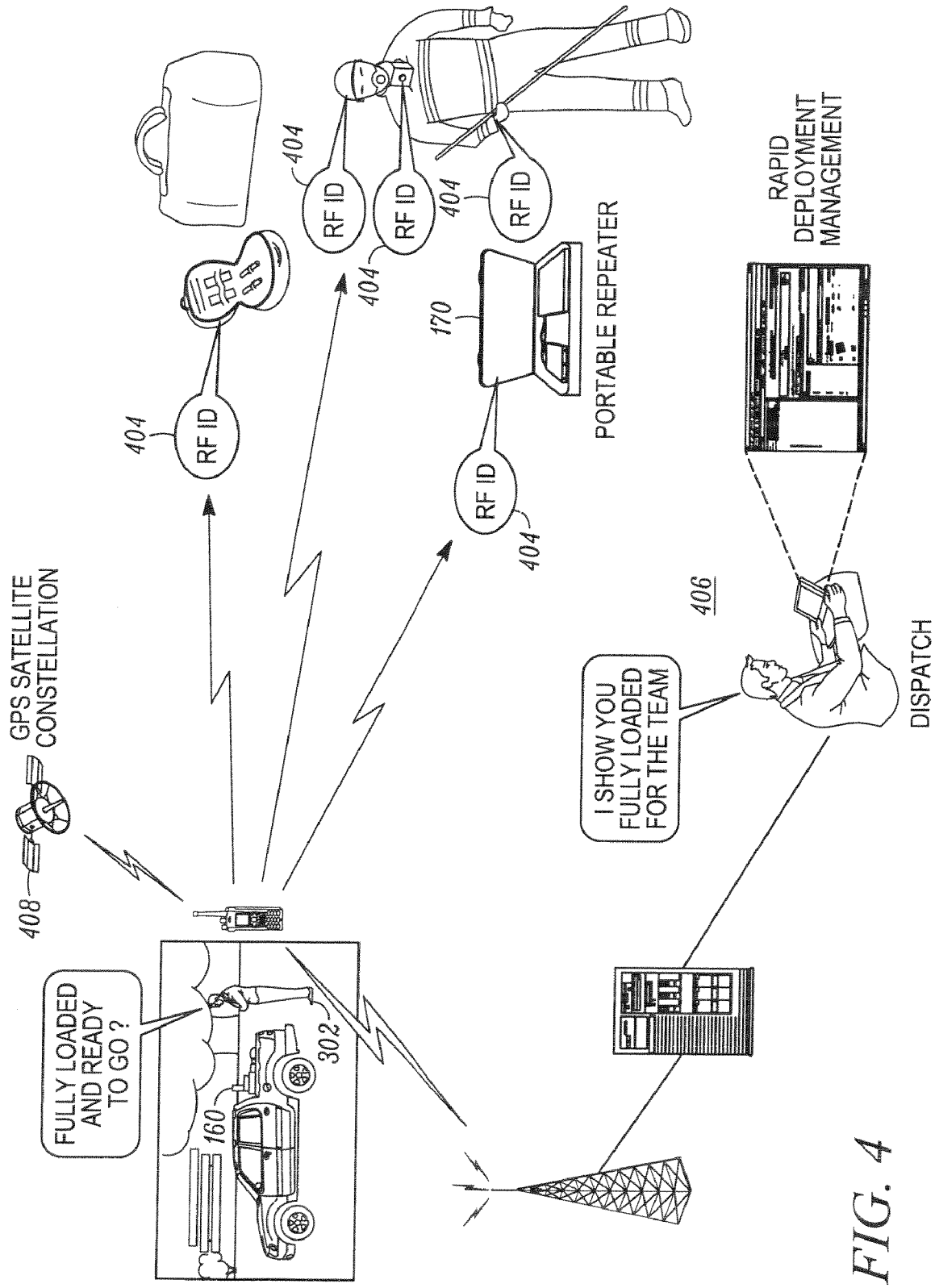
FIG. 4 is a diagram of the communication system deployment process including electronic checklist capability in accordance with some embodiments of the invention.

FIG. 4 is a diagram of the communication system deployment process including an electronic checklist in accordance with an embodiment of the invention. In accordance with the checklist embodiment, communication system 100 includes the pack of portable radios 112, at least one radio including a radio frequency identification (RFID) reader 402. The deployable infrastructure includes deployable infrastructure elements as described above, for either the stand-alone infrastructure mode or expanded infrastructure mode. The deployable infrastructure preferably includes portable repeater 174, extendable antenna platform 172 for supporting the portable repeater, and portable console 160 providing portable dispatch capabilities and programming capability. The plurality of deployable elements are packaged in the single unitary package, RDP 110, for shipping and storing including the pack of portable radios 112 and deployable infrastructure elements for on-site configuration of the communication system without the use of local infrastructure and without prior knowledge of communication system operation.

In the electronic checklist embodiment of FIG. 4, a plurality of RF ID tags 404 are coupled to the portable radios 112 and the deployable infrastructure elements 160, 170 to provide inventory tracking information to the RF ID reader 402 for transmitting to the dispatch station 160. The dispatch station 160 may be the portable dispatch station 160 provided within the package or may alternatively be a pre-existing field dispatch station 406 as part of the expanded infrastructure, operating independently of the elements provided from package.

In a further embodiment of FIG. 4, each radio 112 may provide location information pertaining to that radio as tracked by a GPS system, shown as GPS satellite constellation 408. Additional RF IDs can be shipped in package 110 for placement on rescue equipment 410 used in conjunction with the communication system, such as medical supplies safety helmets to name a few. The RF IDs are used for inventory tracking of the portable radios, the deployable infrastructure elements and rescue equipment, while the GPS is used for location tracking of the portable radios 112, the deployable infrastructure elements 160, 170 and the rescue equipment 410.

A method for ordering and acquiring a communications system having the electronic checklist is provided using the method of FIG. 2 with an additional checklist option selection being made available at step 202. By placing an order by a first party to a second party for a portable communication system that operates either as a stand-alone-system or an expanded infrastructure system (or both) and further selecting inventory tracking capability for either of these two modes. In response to the order from the first party, the second party packing a plurality of deployable communication elements formed of portable radios and portable infrastructure into a unitary package and in accordance with the checklist embodiment, at least one of the portable radios includes an RF ID tag and at least one of the deployable elements includes and RFID reader 402 to provide tracking once deployed within a field of operation, i.e. on-site.

The selection taking place at 202 of FIG. 2, as before includes selecting the frequency band of operation; selecting between a disaster mode package option with stand-alone infrastructure and or expanded mode option for deploying expanded infrastructure between gaps of existing systems. Again, the selection preferably designates whether a disposable battery option or a rechargeable battery option for the portable radios is assigned (preferably disposable for disaster mode and rechargeable for expanded mode). In accordance with the checklist embodiment, the additional selection at 202 of adding an electronic checklist will further designate the coupling RFID tags and at least one reader to at least one deployable communication element and possibly further packing additional RF IDs within the unitary package for rescue equipment identification. The package is shipped as before at step 224.

As the package is unpacked by user 302 in FIG. 4, the RFIDs are preferably already attached to the communication elements. If not already attached, the user attaches the RF IDs 404 to at least one of the plurality of communication elements for inventory asset tracking. The additional RFIDs can be attached by the user to rescue equipment 410 such as medical bags and helmets to help track inventory being deployed into the field.

Figure 5:
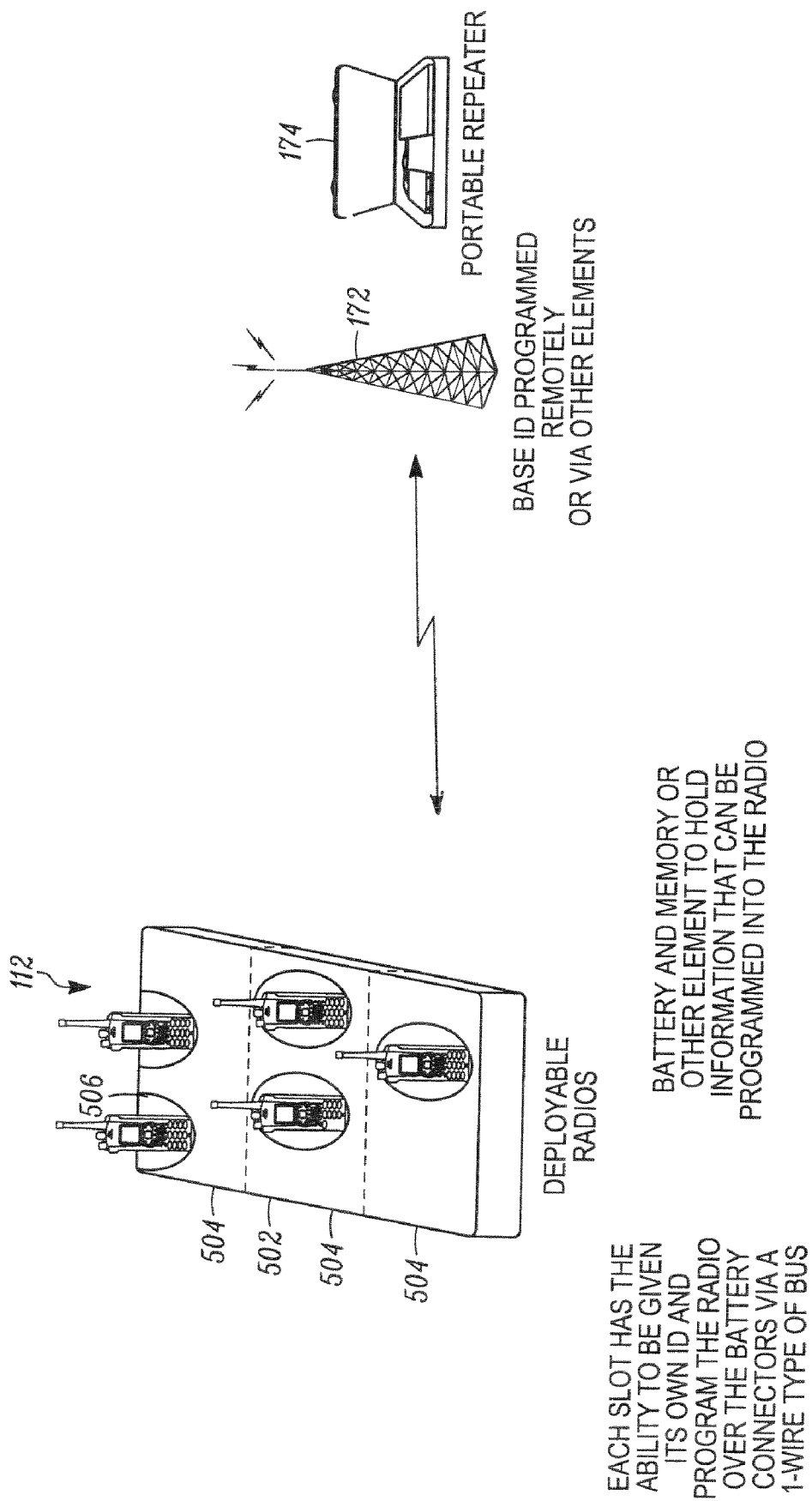
FIG. 5 is a more detailed view of a rack used in the deployable communication system in accordance with some embodiments of the invention.

FIG. 5 is a more detailed view of the carry tray 502 used in the deployable communication system in accordance with an embodiment of the invention, preferably an embodiment utilizing secondary cells. For an expanded infrastructure mode having the rechargeable battery option, the programming of the radios 112 can be accomplished using single-wire bus communication between a charger contact of a portable radio and the rack 504 of carry tray 502. The pack of portable radios 112 and deployable infrastructure 160, 170 are packaged within the unitary package RDP 110 for shipping and storing for either immediate or future on-site configuration of the system without the use of local infrastructure and without prior knowledge of communication system operation. In accordance with this embodiment, the carry tray 502 outlined in FIG. 1 is shown in greater detail, the including racks 504 and slots 506 for retaining each individual radio 112 of the pack of portable radios. Each slot 506 includes charge contacts (shown in FIG. 6) for charging each portable radio. As shown in FIG. 6, each radio battery 606 includes memory 608 for storing information to be programmed into the radio 112.

In accordance with this secondary cell embodiment, each slot 506 includes control circuitry 602 for programming each portable radio 112 from a remote source 504, the programming being uploaded to the radios via the charge contacts 604 within the slot. The charge contacts are thus used to charge the secondary cells and program the radios 112. A user 302 simply unpacks the portable console 160, plugs the tray 502 into a power supply and begins the download of programming information. The download of information to the radios can be either directly from the battery memory 608 into the radio 112 via single-wire bus communications, or over the air from the portable console 160 to "smart tray" 502 via PAN and then to the radios 112 via one wire bus downloading. The embodiment of FIGS. 5 and 6 thus show how the portable radios can be programmed via portable and remote infrastructure using single-wire bus technology and the use of a "smart rack".

Each rack 504 preferably has an identification number associated therewith and each slot 506 of each rack has a sub-identification number that is communicated to each radio as the radio is pulled out of its respective slot. The sub-identification number provides a unique ID for each radio for use in an ad hoc network. A "call-list" is formed from the unique IDs of the radios, the call list providing information associated with a user assigned to each radio. Additional radio deployment packages for linking additional radios with additional unique IDs can also be included to expand the communication system. The application of IDs in the smart rack embodiment provides an alternative to the use of individual RFID tags described earlier.

The embodiment of FIGS. 5 and 6 impact the charging and programming capability of the system 100. In response to the order, a plurality of communication elements formed of portable radios and portable infrastructure are packed into a unitary package, the portable radios having rechargeable batteries coupled thereto, the rechargeable batteries each having a memory for storing programming information. The portable radios are inserted into the tray 502, the tray including slots 506 for retaining each radio, each slot including charge contacts 604. Batteries are charged on-site in response to the rack being coupled to a power source such as the portable generator or via installed elements powered by traditional critical infrastructure. Programming of the portable radios 112 occurs via the charge contacts 506. Programming is preferably performed by downloading programming information to the tray 502 from a remote dispatch station 504 via the portable console 160, the tray 502 downloading the programming information via the battery contacts 602 to the portable radios 112.

Alternatively, if pre-loaded information is used then programming of the radios 112 may be performed by downloading information stored in the battery memory directly_to each portable radio 112 via the charge contacts 604 without the use of external infrastructure.

In accordance with the embodiments of FIGS. 5 and 6, each radio is removed from its respective slot fully programmed and charged, regardless of whether the battery memory 606 alone was used for programming the radio 112 or whether infrastructure information (from portable infrastructure or remote infrastructure) was uploaded to the tray 502 and from the tray to the charge contacts 604 for programming the radio.

Thus, there has been provided a quickly deployable communication system. The system can be ordered and stored, if needed, to facilitate rapid deployment of radios. The ordering process allows the parameters of stand-alone infrastructure mode or expanded infrastructure mode (or both) to be selected along with frequency of operation. In response to the selection, other parameters are assigned, such as primary or secondary battery cells. A lay person can open the package, turn on the portable console, and follow instructions that enable automatic programming of the radios. Programming information to the radios is achieved by either PAN technology (wireless) and/or single-wire bus technology (wired). Programming information can also be stored within a memory of the battery to be automatically uploaded to the radios using the single-wire technology.

Once again, the system includes a portable repeater, an extendable antenna platform for supporting the portable repeater; a portable console to provide a remote dispatch station; a unitary package for shipping and storing the pack of portable radios and deployable infrastructure elements for on-site configuration of the communication system without the use of local infrastructure and without prior knowledge of communication system operation.

The system can further incorporate an electronic checklist by, including a plurality of RF ID tags coupled to each portable radio, the portable repeater, the extendable antenna platform, the portable console and the unitary package, the plurality of RF IDs providing inventory tracking information to the RF ID reader for transmitting to a remote dispatch station. Location information can also be tracked by loading location information within each radio to be tracked by a location tracking system, such as GPS system. Programming is accomplished in wireless or wired manner through the use of the portable console and smart rack, either through single-wire technology or PAN technology.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A communication system, comprising:
   a pack of portable radios;
   a deployable infrastructure, including:
   a portable console providing a remote dispatch station and programming capability for the pack of portable radios;
   a unitary package for shipping and storing the pack of portable radios and deployable infrastructure for on-site configuration of the communication system, the unitary package having carrying trays including smart racks having slots formed therein for storing the portable radios, each smart rack having an identification number associated therewith and each slot of each smart rack having a sub-identification number, wherein upon a user unpacking the pack of portable radios and the deployable infrastructure from the unitary package, the identification number and sub-identification number are automatically communicated to each portable radio to allow each portable radio to be wirelessly programmed prior to removal from its respective slot.

2. The communication system of claim 1, wherein each portable radio includes a preloaded battery.

3. The communication system of claim 1, wherein the portable console wirelessly programs each radio of the unitary package via personal area network technology.

4. A communication system, comprising:
a pack of portable radios;
a deployable infrastructure, including:
a portable repeater;
an extendable antenna platform for supporting the portable repeater;
a portable console providing a remote dispatch station and programming capability for the pack of portable radios;
a unitary package for shipping and storing the pack of portable radios and deployable infrastructure for on-site configuration of the communication system, the portable radios being stored in carrying trays within the unitary package; and
the on-site configuration being enabled by a user unpacking the pack of portable radios and the deployable infrastructure from the unitary package and further executing instructions provided in the portable console to automatically program the pack of portable radios via the portable console without the use of local infrastructure and without prior knowledge of communication system operation; and
wherein the carrying trays include smart racks having slots formed therein, each rack having an identification number associated therewith and each slot of each rack having a sub-identification number, wherein upon the user unpacking the pack of portable radios and the deployable infrastructure from the unitary package, the identification number and sub-identification number are automatically communicated to each radio to allow each radio to be wirelessly programmed prior to removal from its respective slot.

5. The communication system of claim 4, wherein the sub-identification number provides a unique ID for each radio for use in an ad hoc network.

6. The communication system of claim 5, wherein a "call-list" is formed from the unique IDs of the radios, the call list for providing information associated with a user assigned to each radio.

7. The communication system of claim 6, further comprising additional packages for linking additional radios to the communication system with additional unique IDs.

8. The communication system of claim 7, wherein each of the packages includes at least one of a belt clip and a carry case.

9. The communication system of claim 4, wherein the unitary package is stored until an unforeseen event causes local communication systems to be inoperable.

10. The communication system of claim 9, wherein users unfamiliar with communication system, unpack the unitary package, each radio automatically becoming wirelessly cloned upon removal from each slot of the carry tray.

11. The communication system of claim 1, wherein the portable console is pre-programmed with nationwide interoperability frequencies, the user of the portable console selecting the frequency band of operation from a user-friendly list generated upon power-up of the portable console, the user-friendly list intended for lay-person use of the system.

12. The communication system of claim 11, wherein the portable console is pre-programmed to provide one of: a single infrastructure mode, for stand-alone operation and expanded infrastructure mode.

13. The communication system of claim 1, wherein the unitary package is formed based on a customer order, the customer order including:
a selection of frequency band of operation;
a selection of stand-alone infrastructure mode or expanded mode infrastructure; and
a disposable battery option or a rechargeable battery option being assigned in response to the selection of infrastructure mode.

14. The communication system of claim 13, wherein the portable console provides instructions to the user upon power-up, the instructions including user to remove each radio from the unitary package to disperse to other individuals, the radios cloning themselves upon removal from the package.

15. The communication system of claim 1, wherein unitary package is sold to a service provider and the service provider pre-programs the pack of portable radios using service provider frequencies, the service provider leasing or renting the unitary package to an end customer.

* * * * *